Oct. 31, 1950 U. S. BERGER 2,527,617
RADIO RECEIVING SYSTEM
Filed Dec. 30, 1947
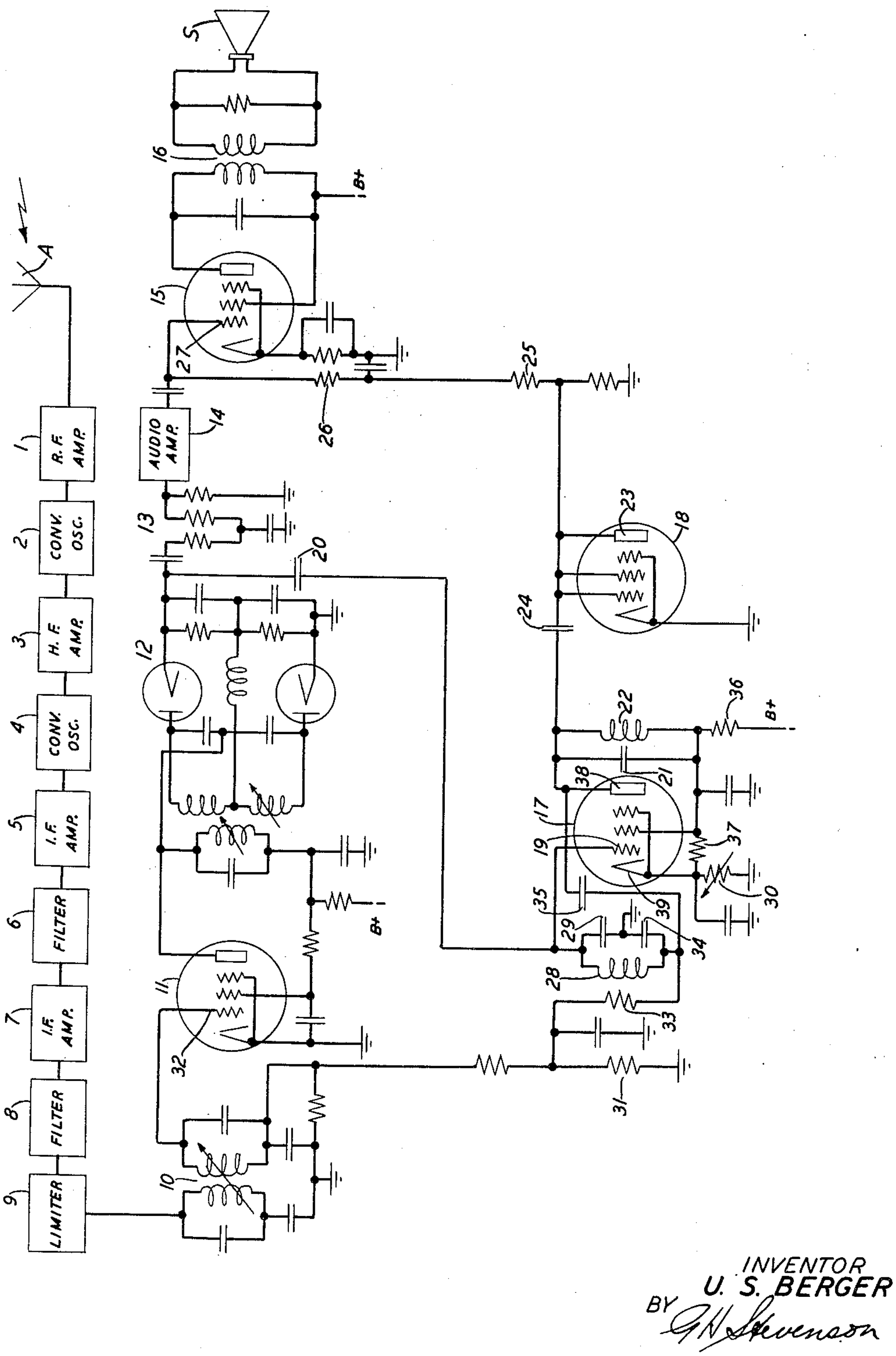
INVENTOR
U. S. BERGER
BY G.N. Stevenson
ATTORNEY Patented Oct. 31, 1950

2,527,617

UNITED STATES PATENT OFFICE 2,527,617

RADIO RECEIVING SYSTEM

Uriah S. Berger, Rockaway, N. J., assignor to Bell Telephone Laboratories, Incorporated, New York, N. Y., a corporation of New York Application December 30, 1947, Serial No. 794,502

5 Claims. (Cl. 250—20)

This invention relates to radio receiving systems and, more particularly, to an improved squelch circuit for muting the output of a radio receiver when no useful signaling energy is being received.

As is well known in the art, when a radio receiver is in an operating condition and no carrier is being received, noise voltages, such as thermal agitation potentials, introduced or developed in the radio frequency amplifier and converter stages are amplified in the succeeding stages and are reproduced at the output of the receiver. This reproduced noise is quite annoying to a listener and it has been the practice to employ various types of squelch circuits for muting the output of a radio receiver during periods when no carrier is being received and also during periods when the received signaling energy has too low a level to be intelligible.

Some of the squelch circuits used heretofore in radio receiving systems, such as those described in Patent 2,343,115 issued February 29, 1944, to D. E. Noble, are dependent for their operation upon control voltages derived from those noise energies which are present in such systems and which lie outside the range of the audio frequencies used for communication purposes. These control voltages, which have magnitudes proportional to the level of the noise energies, are supplied to a so-called noise amplifier and, after amplification, are rectified and are applied as a bias potential to the control grid of an audio amplifier. When the noise level is high, the magnitude of this bias potential will be sufficiently large to render the audio amplifier non-conductive thereby muting the output of the radio receiver.

When a squelch circuit is incorporated in a radio receiver, care must be used to prevent the receiver from being muted when intelligible signals of low level are received during periods of high noise. It is also desirable that a squelch circuit should positively mute its associated receiver following the termination of a received carrier and that, after having been muted, the receiver should be restored to a signal reproducing condition in response to the reception of a carrier. In other words, a squelch circuit should effect abrupt transitions in the muting of a receiver in response to relatively small changes in the amplitude of a received carrier. In order to produce abrupt transitions from a muted condition of a radio receiver to a non-muted condition and vice versa, it is desirable to provide a high rate of change in the amplitude of the noise voltages with respect to changes in the amplitude of a received carrier.

Accordingly, it is an object of the invention to provide means for increasing the abruptness with which a squelch circuit changes its associated radio receiver from a muted condition to a non-muted condition and vice versa with respect to changes in the level of a received carrier.

An additional object is to substantially reduce regeneration and self-oscillation of the noise amplifier used in a squelch circuit.

These and other objects of the invention are attained by operating the noise amplifier as a harmonic generator. This is accomplished by negatively biasing the grid of the noise amplifier substantially to plate current cut-off and by providing the noise amplifier with a tuned input circuit and with an output circuit tuned to a harmonic of the resonant frequency of the input circuit. By thus operating the noise amplifier as a harmonic generator, the rate of change in the level of its output with respect to variations in the level of a received carrier is considerably increased because it is a characteristic function of a harmonic generator to produce rapid transitions from low outputs to large outputs even in response to relatively small changes in its input voltages. Since the plate circuit of the noise amplifier is tuned to a harmonic of the resonant frequency of the grid circuit, the tendency toward self-oscillation and instability of the noise amplifier is considerably reduced. Regeneration of the noise amplifier can be substantially reduced by neutralization thereby enabling the various elements of the squelch circuit to be located close together in the radio receiver in a compact manner. The rapidity of the action of the squelch circuit is further increased by utilizing a control potential having a magnitude that is proportional to the level of the received signal energies. This control potential may be derived from the grid circuit of the limiter or an amplifier stage in a frequency modulation receiver or from the automatic volume control circuit of an amplitude modulation radio receiver and is applied to the grid of the noise amplifier for controlling its gain.

These and other features of the invention are more fully discussed in connection with the following detailed description of the drawing which illustrates one embodiment of the invention incorporated in a frequency modulation radio receiving system.

In the drawing, a frequency modulation radio receiving system is shown to include a number of conventional units connected in cascade. These units include a receiving antenna A, a radio frequency amplifier 1, a first converter and oscillator unit 2, a high frequency amplifier 3, a second converter and oscillator unit 4, a first intermediate frequency amplifier 5, a first filter network 6, a second intermediate frequency amplifier 7, a second filter network 8, and a first limiter 9. The output of the first limiter 9 is coupled by a tuned transformer 10 to the input of a second limiter 11 which delivers its output to a frequency modulation signal detector, or discriminator, 12. The output from the discriminator 12 is connected through a de-emphasis network 13 to the input of an audio amplifier 14 which has its output coupled to an output audio amplifier tube 15. A transformer 16 couples the output from the output audio amplifier 15 to a signal reproducing device, such as a loudspeaker S.

When this receiving system is in an operating condition and no carrier wave is received, noise voltages of the types described in the Noble patent mentioned above, such as thermal agitation potentials, will be introduced or developed in the radio frequency amplifier and converter stages and will be amplified in the succeeding amplifier stages and will appear in the output of the discriminator 12. If this receiving system were not equipped with a squelch circuit, the noise voltages would be further amplified by the audio amplifiers 14 and 15 and would be reproduced by the loudspeaker S.

Such undesired reproduction of the noise voltages is prevented by the squelch circuit which includes a noise amplifier 17 and a noise rectifier 18. The input to the noise amplifier 17 is coupled to the output of the discriminator 12 by a coupling condenser 20. The input to the noise rectifier 18 is coupled to the output of the noise amplifier 17 by a coupling condenser 24 and its output, which is negative with respect to ground, is supplied through two resistances 25 and 26 to the control grid 27 of the output audio amplifier 15 as a varying bias potential. When the rectified noise voltages have a large magnitude, as would be the case when no carrier is being received, the bias potential imposed upon the grid 27 will be so high that the output audio amplifier 15 will be rendered non-conductive. This cuts off, or squelches, the input to the loudspeaker S which is thereby silenced. Those skilled in the art refer to this disabling action as "closing the squelch."

When a signal modulated carrier is received by the antenna A, the signal voltages developed by the various units of the receiving system will tend to saturate the limiters 9 and 11. Due to the characteristic function of a limiter, the level of the noise voltages will be greatly reduced, as is described in the Noble patent mentioned above, with the result that the output of the frequency modulation signal detector, or discriminator, 12 will consist chiefly of speech signals. Those skilled in the art refer to this action as "noise quieting."

In order to prevent these speech signals from operating the noise amplifier 17 and the noise rectifier 18 and thereby closing the squelch, the input circuit of the noise amplifier 17 is made selective for energy having only frequencies that are outside the range of useful speech frequencies. This is accomplished in this embodiment of the invention by providing the grid circuit of the noise amplifier 17 with a single tuned circuit comprising an inductance 28 and two condensers 29 and 34 connected in series. Since the frequency of speech signals is seldom higher than 4 kilocycles, the values of the inductance 28 and the condensers 29 and 34 are selected to be such as will cause the grid circuit to resonate at approximately 9½ kilocycles. This effectively excludes speech frequencies from the input to the noise amplifier 17 and insures that the squelch will be closed only by energy having frequencies outside the range of useful audio frequencies. It is to be understood that the resonant frequency of this grid circuit need not necessarily be selected from those frequencies which are above the speech spectrum but, if desired, may be selected from those frequencies which are below the speech spectrum.

Since the level of the noise voltages present in the output of the discriminator 12 is greatly reduced when speech signals are present due to the noise quieting action described above, the output of the noise rectifier 18 is correspondingly reduced. Its output energy will now be of such a low level that the output audio amplifier 15 will not be biased to cut-off but will become conductive and will supply the amplified speech energy through the transformer 16 to the loudspeaker S for reproduction. Those skilled in the art refer to this enabling action as "opening the squelch."

The squelch is thus opened and closed in accordance with variations in the magnitude of the bias potential applied to the control grid 27 of the output audio amplifier 15 by the noise rectifier 18. This bias potential will range from zero or a low ineffective value during the reception of strong signals to a high or effective value during the absence of a carrier. When weak signals are received, the bias potential will have an intermediate value which, in some instances, may be sufficient to block the output audio amplifier 15. As can be understood from the description in the preceding paragraphs, the magnitude of this bias potential varies in accordance with variations in the level of those noise energies that are selected to operate the squelch circuit.

The sharpness of the squelch circuit, which may be defined as the degree of abruptness with which the output of its associated receiver is changed from a muted condition to a non-muted condition and vice versa with respect to changes in the level of a received carrier, is dependent upon the change in the level of those noise voltages that are selected to operate it. Since the percentage of the change in the level of the noise voltages in a frequency modulation receiver is greater for narrow noise band widths located near the operating frequency than for wide noise band widths, the selection of such a band of noise voltages for operating the squelch will increase the sharpness of the squelch circuit.

This is accomplished in the system shown in the drawing by employing in the output circuit of the noise amplifier 17 a single tuned circuit comprising a capacitance 21 and an inductance 22 having such values as will cause this circuit to be resonant at approximately 19 kilocycles which is the second harmonic of the resonant frequency of the grid circuit. This use of two single tuned circuits, one at the input of the noise amplifier 17 and one at its output, provides the desired narrow band of noise voltages for increasing the sharpness of the squelch circuit.

Since the plate circuit of the noise amplifier 17 is tuned to a harmonic of the resonant frequency of the grid circuit, a higher gain can be used even when using a tube of moderate grid-plate capacity. Another advantage is that, whereas the ordinary noise amplifier used heretofore may have a tendency toward self-oscillation or "singing" which sometimes produces sufficient voltage to close the squelch when useful speech energy of low level is being received, the tendency toward self-oscillation and instability of the noise amplifier 17 is reduced considerably by tuning its plate circuit to a harmonic of its grid circuit.

The chief improvement results from negatively biasing the grid of the noise amplifier 17 substantially to plate current cut-off for causing the noise amplifier 17 to function as a harmonic generator and to thereby produce harmonic voltages in its output circuit which will be at a maximum when no carrier is received. By thus operating the noise amplifier 17 as a harmonic generator a substantial increase in the sharpness of the squelch action is achieved. This is due to the characteristic nature of the operation of a harmonic generator which produces sharp transitions from low outputs to large outputs even in response to relatively small changes in its input voltages at the threshold level. In other words, the operation of the noise amplifier 17 as a harmonic generator greatly increases the rate of change in the level of its output which in turn substantially increases the sharpness of the squelch circuit.

Where external capacity coupling may exist between the input and output circuits of the noise amplifier 17, it may be desirable to neutralize the noise amplifier 17 in order to prevent regeneration. This may be accomplished by providing a feedback path for voltages produced by the grid-plate capacity of the tube 17 and also by stray circuit capacities. This feedback path extends from the plate 38 of the noise amplifier 17 to the control grid 19 and includes two capacitances 34 and 35. The values of the capacitances 34 and 35 are so selected as to produce a phase shift of 180 degrees in the voltage fed back to the grid 19 thereby effectively suppressing any tendency of the noise amplifier toward regeneration. In addition to the resulting improvement in the operation of the noise amplifier 17, this permits the components of the squelch circuit to be located closer together than would otherwise be possible.

The threshold level, or sensitivity, of the noise amplifier 17 is controlled by two separate potentials the magnitudes of which vary oppositely. One of these potentials is developed across an adjustable resistor 30 connected in the grid-cathode circuit of the noise amplifier 17. The cathode current produced in the noise amplifier 17 together with bleeder current through resistors 36 and 37 develop a direct current voltage across the resistor 30 which increases the potential of the cathode 39 above ground thus providing the desired grid-cathode bias for the noise amplifier 17.

The other potential which controls the threshold level, or sensitivity, of the noise amplifier 17 is developed across a resistor 31 which is connected in the grid-cathode circuit of the limiter 11. This bias potential, which is negative with respect to ground, is applied through a resistor 33 to the control grid 19 of the noise amplifier 17 to reduce its gain. Since this bias potential is developed by the rectifying action of the grid-cathode circuit of the limiter 11, its magnitude will vary in accordance with variations in the strength of the received signaling energy and will be a maximum when the limiter 9 is saturated with signal energy and will be a minimum when no carrier is received. The magnitude of this bias potential therefore varies in a manner which is the opposite of that in which the magnitude of the noise input to the grid 19 varies because the noise potentials will be of minimum magnitude when the limiter 9 is saturated with signal energy and will be of maximum magnitude when no carrier is received. Due to these oppositely varying potentials, the gain of the noise amplifier 17 will be at a maximum when it is receiving its maximum noise input and will be at a minimum when it is receiving its minimum noise input. Thus, the biasing of the control grid 19 by the potential derived from the limiter 11 serves to further increase the sharpness of the squelch circuit and renders its action more positive.

Although a specific embodiment of the invention has been disclosed in the drawing and described above for the purpose of explaining the principles and features of operation of the invention, it is to be understood that the invention is not limited thereto but is capable of modification, rearrangement, and substitution of elements without exceeding the scope of the claims appended hereto. For example, the bias potential developed across the resistor 31 need not necessarily be derived from the limiter 11 but may, if desired, be derived from an earlier stage in the receiving system. Although the receiving system shown in the drawing is a frequency modulation system, the invention is not restricted to this type of system but can be incorporated in an amplitude modulation receiving system since the noise voltages present in such a system can be utilized in much the same manner as that described above by coupling the tuned input circuit of the noise amplifier to the output of the amplitude modulation signal detector. The bias potential produced across the resistor 31 may be derived from the automatic volume control circuit of an amplitude modulation receiving system because, when a carrier is received in such a system, the automatic volume control circuit will reduce the gain of the system thereby reducing the level of the noise voltages.

What is claimed is:

1. A squelch circuit for a radio receiving system having a detector and an audio amplifier tube with a control grid, said squelch circuit comprising an amplifier tube having a tuned input circuit coupled to said detector and an output circuit tuned to a harmonic of the resonant frequency of the input circuit, rectifying means for rectifying the output energy from said output circuit, and means for applying the rectified energy to said control grid for controlling the conductivity of said audio amplifier tube.

2. A squelch circuit for a radio receiving system having a plurality of amplifying stages and a detector and a signal reproducing circuit, said squelch circuit comprising an electronic amplifier having a tuned input circuit coupled to said detector and an output circuit tuned to a harmonic of the resonant frequency of the input circuit, rectifying means for rectifying the output energy from said output circuit, means for applying the rectified energy to said signal reproducing circuit for control thereof, means for deriving a bias potential from one of said amplifier stages, and means for applying said bias potential to said input circuit for controlling the gain of said electronic amplifier.

3. A squelch circuit for a frequency modulation radio receiving system having a limiter coupled to a discriminator and an audio amplifier tube with a control grid, said squelch circuit comprising an electronic amplifier having a tuned input circuit coupled to said discriminator and an output circuit tuned to a harmonic of the resonant frequency of the input circuit, rectifying means for rectifying the output energy from said output circuit, means for applying the rectified energy to said control grid for controlling the conductivity of said audio amplifier tube, said limiter having a grid circuit, means for deriving a bias potential from said grid circuit, and means for applying said bias potential to said input circuit for controlling the gain of said electronic amplifier.

4. In a frequency modulation radio receiver including a frequency discriminator and an audio amplifier, means for producing a direct voltage proportional to the noise output of said discriminator in the absence of a received carrier comprising a first circuit resonant at a frequency outside the range of audibility and coupled to the output of said discriminator, a second circuit resonant at a frequency that is a harmonic of the resonant frequency of the first circuit, a noise amplifier comprising an electronic tube having a control grid, said noise amplifier having its input connected to said first circuit and its output connected to said second circuit, means for negatively biasing said control grid substantially to plate current cut-off for causing the noise amplifier to produce harmonic voltages across said second circuit that will be at a maximum during the absence of a received carrier, means for rectifying the voltage developed across said second circuit, and means for controlling said audio amplifier by the direct current output of said rectifying means to block said audio amplifier during the absence of a received carrier.

5. A radio receiver comprising a detector, an audio amplifier, a noise amplifier having a cathode and an anode and a control grid, a first single tuned circuit resonant at a frequency outside the audio range connected between said grid and cathode and coupled to the output of said detector, a second single tuned circuit connected between said anode and cathode and resonant at a harmonic of the resonant frequency of said first single tuned circuit, means for negatively biasing said control grid substantially to plate current cut-off for causing the noise amplifier to function as a harmonic generator and to produce harmonic voltages across said second single tuned circuit in the absence of a received carrier, means for rectifying the voltage developed across said second single tuned circuit, and connections for supplying the rectified voltage to said audio amplifier to block its transmission.

URIAH S. BERGER.

REFERENCES CITED

The following references are of record in the file of this patent:

UNITED STATES PATENTS

| Number | Name | Date |
|---|---|---|
| 2,343,115 | Noble | Feb. 29, 1944 |
| 2,397,830 | Bailey | Apr. 2, 1946 |